Feb. 8, 1949.   F. H. STONER   2,461,188
SELF-PROPELLED TREE FELLING AND LOG CUTTING SAW RIG
Filed Oct. 11, 1945
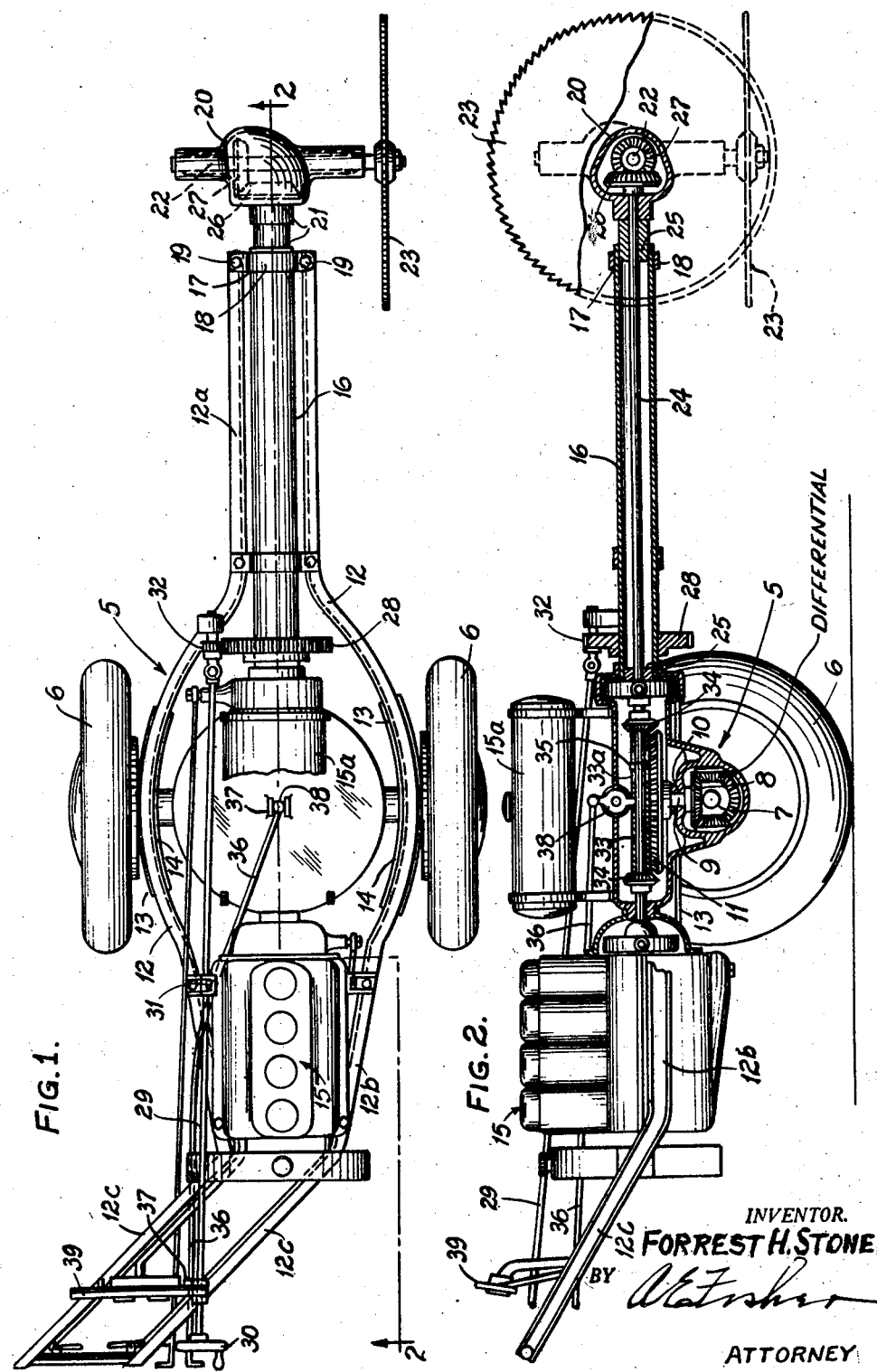
INVENTOR.
FORREST H. STONER
BY
ATTORNEY Patented Feb. 8, 1949

2,461,188

UNITED STATES PATENT OFFICE 2,461,188

SELF-PROPELLED TREE FELLING AND LOG CUTTING SAW RIG

Forrest H. Stoner, Dixon, Mo.

Application October 11, 1945, Serial No. 621,761

1 Claim. (Cl. 143—43)

This invention relates to timber saws or saw-rigs for working in timber, for felling trees, cutting the trunks thereof into suitable lengths for cord-wood or the like, for cutting brush and weeds.

The primary object of the invention is to provide a wheel-borne saw-rig of the kind referred to, the same being mounted upon a suitable two-wheeled chassis or truck and powered by a suitable engine such as a gasoline engine, the apparatus including a supporting frame mounted for oscillatory movement upon the chassis or truck, and including forwardly and rearwardly extending portions of the frame for supporting at the forward end the saw-operating mechanism, and at the rear end the control devices and accessories.

Another object of the invention is to provide in an apparatus of the kind referred to, a two-wheeled truck or chassis, an elongated supporting frame mounted at its medial portion upon the chassis and arranged for lateral oscillatory movement thereon, a tubular drive shaft housing longitudinally and rotatably journaled through the forward end of the supporting frame, an elongated saw-shaft and gear housing rigidly and transversely anchored to the forward end of the tubular drive shaft housing, a saw-shaft journalled longitudinally through the saw-shaft and gear housing, one outer extended end of the saw-shaft being adapted for removably receiving a variety of saws for accomplishing various kinds of work, a drive shaft journalled longitudinally through the tubular drive-shaft housing with the forward end thereof entered into the saw-shaft and gear housing, gear connections arranged in intermeshed relation on the forward end of the drive shaft and the said saw-shaft, means for rotating the tubular drive shaft housing for turning the saw-shaft and attached saw to any degree of angularity relative to the work, as may be required, a power unit and accessories on the rear end of the supporting frame, a differential connection between the power unit and the truck wheels, means for braking the wheels of the truck, and handles for manipulating the apparatus to operative position.

With the stated objects in view, together with such additional objects and advantages as may appear from the following specification, attention is directed to the accompanying drawing as exemplifying a preferred embodiment of the invention, and wherein:

Figure 1 is a top plan view of a timber saw or sawing rig as constructed in accordance with this invention, the circular saw thereof being here shown as turned and positioned vertically, as would be required in the sawing of logs or other horizontally positioned work.

Figure 2 is a longitudinal vertical section on the line 2—2 of Figure 1, an alternate or horizontal positioning of the saw being also here indicated in dotted lines, as would be required for felling trees or the like.

In practising this invention I provide a two-wheeled truck or chassis represented generally at 5, the wheels 6 thereof being rigidly mounted or keyed upon the ends of a two-part axle 7 of conventional structure, the parts thereof being operatively connected by the differential 8, the latter being in turn operated by the vertically extended stub-shaft 9 rotatably journaled in the chassis as indicated at 10, and at the upper end of which stub-shaft is rigidly mounted or keyed the large and horizontally disposed bevel driven gear 11.

An elongated supporting frame 12 is balanced upon the chassis 5, the frame being suitably flared at a medial point thereof for this purpose, as clearly shown in Figure 1. This frame is arranged and is mounted upon the chassis for lateral oscillatory movement from side to side for facilitating the horizontal movements of the saw in felling trees or the like, and for the purpose of such mounting arcuate or circular rests or bearing elements 13 are rigidly mounted on the chassis and upon which the frame 12 has its rotative bearing, as indicated at 14.

The frame 12 includes forwardly and rearwardly extended, integrally formed or connected, narrowed or reduced portions 12a and 12b, for carrying the working elements and accessories of the machine, and as will now be described. A suitable power unit 15 is mounted upon the rear end 12b of the frame and handles 12c are extended angularly up from the frame rearwardly of the power unit as means for manipulating and operating the machine. A tubular drive shaft housing 16 is longitudinally extended through the forward end 12a of the frame, and is rotatably journaled therein in bearings 17 carried in looped straps 18 the ends of which are bolted at 19 to the sides of the frame, the said straps encircling the drive shaft housing 16 at the ends thereof or adjacent the ends. An elongated saw-shaft and gear housing 20 is rigidly and transversely anchored in any conventional manner to the forward end of the tubular drive shaft housing 16, as indicated at 21, and a saw shaft 22 is journaled longitudinally or axially through the housing 20, one outer extended end of the saw-shaft being adapted for removably receiving a variety of saws differently toothed for accomplishing various kinds of work, one of such saws being shown at 23, and being removably mounted upon the end of the saw-shaft 22 in any conventional manner. A drive shaft 24 is extended axially through the tubular drive shaft housing 16, being supported and journaled in the bearing blocks 25 rigidly seated within the ends of the housing 16, with the forward end of the shaft entered into the saw-shaft and gear housing 20. A bevel gear 26 is rigidly keyed upon the forward end of the shaft 24 within the housing 20 and is placed in mesh with a similar bevel gear 27 keyed upon the saw-shaft 22, whereby rotation of the shaft 24 results in the working rotation of the saw 23. A spur gear 28 is anchored upon the rear end of the tubular drive shaft housing 16, and an operating rod 29 with handle 30 is journaled at 31 through extensions from the frame 5, the said rod having keyed upon its forward end a pinion gear 32 in mesh with the large spur gear 28. The handle 30 of this rod is disposed rearwardly as shown, conveniently to the hand of the operator, and whereby rotation of the rod 29 enables the operator to turn the saw 23 from vertical to horizontal position, or to any desired intermediate angular position.

A pinion gear carrier tube or gear shift tube 33 is slidably mounted upon the rear end of the drive shaft 24 as extended forwardly from the power unit 15 immediately over the large driven gear 11, this tube being of a length to overlap the said gear, and small beveled pinion gears 34 are rigidly anchored or keyed upon the ends of this tube in such relation thereto that either gear may selectively be intermeshed with the driven gear 11 by merely sliding the tube 33 forwardly or rearwardly for that purpose. The tube 33 is longitudinally slotted as at 33a, and a lock pin or stud 35 is anchored into the drive shaft 24 and is extended freely out through the slot 33a, whereby the tube 33 is locked against rotation upon the shaft 24 while movable forward or rearward thereon. The pinion gears 34 are spaced sufficiently from the large gear 11 that both gears 34 may be cleared from the gear 11, for placing the transmission gears all in neutral position, as may be required. This gear shifting operation is accomplished by means of a control lever 36 extending from the hand of the operator slidably through supports 37 extended from the frame 5 and connected at its forward end to the shifting devices indicated at 38, for shifting the tube 33 and pinions 34 backward or forward, for the purpose of driving the machine forward or rearward, or for neutralizing the gears for holding the machine stationary to a set working position. For this latter purpose of setting the machine to stationary position for work, any conventional form of brake may be employed. The frame 5 also carries the gas tank 15a for supplying the power unit 15, and the instrument panel 39 upon the handles 12c, which supports the conventional ignition switches and accelerator, or other control devices.

It is thought that the construction, use and operation of the saw-rig comprising the subject matter of this invention, will be fully understood from the foregoing description, and while I have here shown and described a preferred embodiment of the invention, it is understood that the embodiment and structural features as shown, may be changed or modified in minor details as may be desired, not departing however from the essence of the invention, as defined in the appended claim.

I claim:

In an apparatus of the kind described, a two-wheel truck or chassis, the wheels thereof being rigidly mounted upon the ends of a two-part axle shaft the parts thereof being operatively connected by a differential unit, a supporting frame balanced upon the said truck, a power unit and controls at the rear of the frame, timber sawing elements at the forward portion of the frame, a drive shaft operatively connecting the power unit with the timber sawing elements, a stub-shaft journaled vertically in the chassis over the said differential and having a gear at its lower end intermeshing with and operating the differential, a horizontally disposed, bevelled driven gear at the upper end of the said stub-shaft and keyed thereto, a gear-shift tube slidably mounted upon the drive shaft vertically over the differential and the said driven gear, this tube being of a length to overlap the driven gear and being longitudinally slotted to slidably receive a lock pin thereinto as extended from the drive shaft, a lock pin extended as stated from the drive shaft into the slot of the gear shift tube, bevelled pinion gears keyed upon the ends of the gear shift tube in such relation thereto and to the said horizontally disposed, bevelled driven gear at the upper end of the stub shaft, that either of the pinion gears may alternately be intermeshed with the driven gear as desired by sliding the tube forwardly or rearwardly, for driving the chassis either forwardly or rearwardly as desired, and means for thus sliding the gear shift tube forwardly or rearwardly for the stated purpose.

FORREST H. STONER.

REFERENCES CITED

The following references are of record in the file of this patent:

UNITED STATES PATENTS

| Number | Name | Date |
| --- | --- | --- |
| 1,075,061 | Parker | Oct. 7, 1913 |
| 1,085,379 | Coldwell | Jan. 27, 1914 |
| 1,462,764 | Nyquist et al. | July 24, 1923 |
| 1,472,394 | Holt | Oct. 30, 1923 |
| 1,686,983 | Parker | Oct. 9, 1928 |
| 1,858,015 | Hodgson | May 10, 1932 |
| 2,224,757 | Wixson | Dec. 10, 1940 |
| 2,401,796 | Raitch | May 17, 1943 |
| 2,348,588 | Arsneau | May 9, 1944 |

FOREIGN PATENTS

| Number | Country | Date |
| --- | --- | --- |
| 27,542 | Sweden | Oct. 16, 1909 |
| 115,148 | Australia | May 12, 1942 |
| 118,817 | Australia | Aug. 14, 1944 |